United States Patent [19]

Nola

[11] 4,404,511
[45] Sep. 13, 1983

[54] MOTOR POWER FACTOR CONTROLLER WITH A REDUCED VOLTAGE STARTER

[75] Inventor: Frank J. Nola, Huntsville, Ala.

[73] Assignee: The United States of America as represented by the Administrator of the National Aeronautics and Space Administration, Washington, D.C.

[21] Appl. No.: 310,714

[22] Filed: Oct. 13, 1981

Related U.S. Application Data

[63] Continuation-in-part of Ser. No. 199,765, Oct. 23, 1980, abandoned.

[51] Int. Cl.³ .............................................. H02P 1/26
[52] U.S. Cl. .................................... 318/729; 318/778; 318/779; 318/809; 318/438
[58] Field of Search ............... 318/778, 779, 729, 768, 318/771, 798, 805, 807, 809, 810, 812, 813, 825, 826, 438

[56] References Cited

U.S. PATENT DOCUMENTS

| | | | |
|---|---|---|---|
| 4,011,489 | 3/1977 | Franz et al. | 318/798 |
| 4,052,648 | 10/1977 | Nola | 318/729 |
| 4,185,575 | 1/1980 | Brown et al. | 318/778 X |
| 4,194,145 | 3/1980 | Ritter | 318/778 X |
| 4,242,625 | 12/1980 | Hedges | 318/812 X |
| 4,266,177 | 5/1981 | Nola | 318/810 |
| 4,298,831 | 11/1981 | Espelage et al. | 318/805 X |
| 4,333,046 | 6/1982 | Lee | 318/729 X |

Primary Examiner—J. V. Truhe
Assistant Examiner—Richard M. Moose
Attorney, Agent, or Firm—J. H. Beumer; J. R. Manning; L. D. Wofford, Jr.

[57] ABSTRACT

A power factor type motor controller in which the conventional power factor constant voltage command signal is replaced during a starting interval with a graduated control voltage. The present invention adds to the three-phase system of pending application Ser. No. 199,765, filed Oct. 23, 1980, means for modifying the operation of the system for a motor start-up interval of 5 to 30 seconds. The modification is that of providing via ramp generator 174 an initial ramp-like signal which replaces a constant power factor signal supplied by potentiometer 70. The ramp-like signal is applied to terminal 40 where it is summed with an operating power factor signal from phase detectors 32, 34, and 36 to thereby obtain a control signal for ultimately controlling SCR devices 12, 14, and 16 to effect a gradual turn-on of motor 10. The significant difference of the present invention over prior art is that the SCR devices are turned on at an advancing rate with time responsive to the combination signal described rather than simply a function of a ramp-like signal alone. The added signal, the operating power factor signal, enables the production of a control signal which effectively eliminates a prior problem with many motor starting circuits, which is that of accompanying motor instabilities.

8 Claims, 4 Drawing Figures

MOTOR POWER FACTOR CONTROLLER WITH A REDUCED VOLTAGE STARTER

ORIGIN OF THE INVENTION

The invention described herein was made by an employee of the U.S. Government and may be manufactured and used by or for the government of the United States of America for governmental purposes without the payment of any royalties thereon or therefor.

This application is a continuation-in-part of application Ser. No. 199,765, filed Oct. 23, 1980, entitled "Three-Phase Power Factor Controller" now abandoned and replaced by continuation application Ser. No. 476,244, filed Mar. 14, 1983.

TECHNICAL FIELD

This invention relates generally to power input controls for induction motors, and particularly to a power factor type motor controller incorporating a reduced voltage starting capability.

BACKGROUND ART

In the applicant's U.S. Pat. No. 4,052,648, entitled "Power Factor Control System for A.C. Induction Motors", there is disclosed a power reduction system for induction motors in which the operating power factor of a motor is monitored, and the effective voltage input to the motor is controlled as a function of the difference between a commanded power factor signal and the operating power factor. In the parent application, the applicant disclosed a power factor type control system particularly adapted for three-phase induction motors.

In addition to minimizing motor power consumption during normal running conditions, which was the goal of referenced patent application, a second area of concern is that of current surges which occur when a motor is first turned on. These surges can amount to five to eight times normal operating current and are both wasteful of electrical power and can contribute to excessive load surcharges being borne by electrical users. While discrete starting circuits have been employed which ideally gradually apply a starting voltage, it has been found that in some instances, these circuits fail to provide a smooth start-up, and not infrequently there may occur significant motor vibrations during at least a portion of the start-up interval.

It is the object of this invention to provide a single control system which both regulates power usage during normal running of a motor and provides for a graduated turn-on of motor voltage without the attendant problem of motor vibration. It is a particular object of the invention to provide a system of this category for a three-phase motor where graduated voltage starting circuits are most frequently used.

DISCLOSURE OF THE INVENTION

In accordance with this invention, signal means are provided which initially block the application of the normal or "run" power factor command signal, and by means of a ramp signal generator, there is provided an increasing, with time, voltage in place of that command signal. This increase in voltage is of an amplitude and rate which will effect a graduated turn-on of the thyristor or thyristors of the motor circuit, effecting a full turn-on in a selected period of typically 5 to 30 seconds. A comparator examines the ramp voltage, and when the ramp voltage has risen sufficiently to effect a full turn-on of the thyristors and full motor operating speed, the comparator provides a signal which unblocks the normal power factor command signal, enabling the turn-on of a thyristor or thyristors to thereafter be determined by motor loading in a conventional manner for a power factor type controller.

DETAILED DESCRIPTION OF THE DRAWINGS

Figure 1:
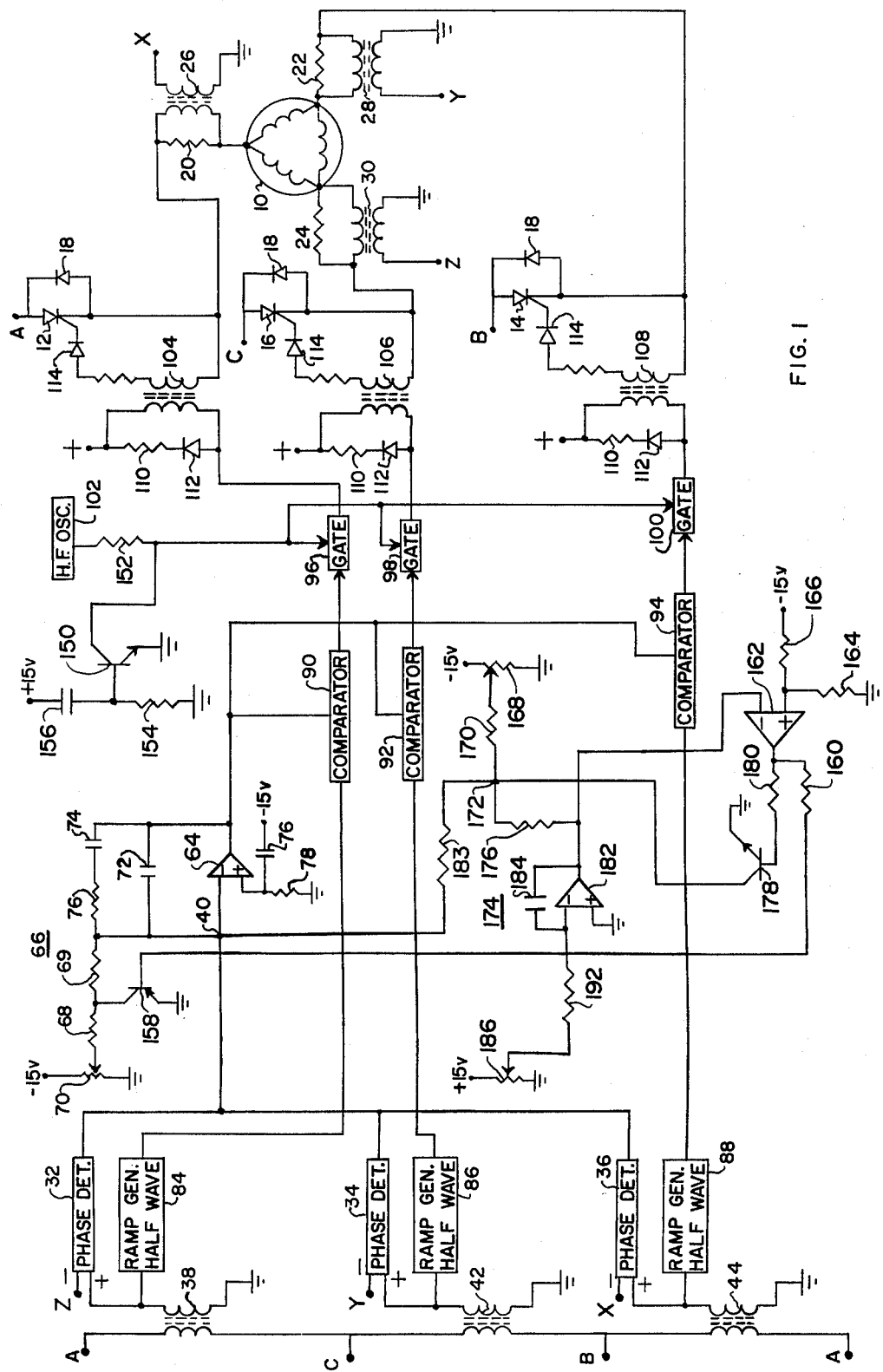
FIG. 1 is an electrical schematic diagram of an embodiment of the invention.

FIG. 1 illustrates a three-phase power factor control system employing the invention. Three-phase motor 10 is powered through SCR (silicon control rectifier) devices 12, 14, and 16 from a three-phase power line, typically providing 220 or 440 volts, 60 cycle, A.C. from terminals A, B, and C. One phase of such a signal is illustrated by voltage wave a of FIG. 3. As the SCR devices provide for conduction only in one direction, a diode 18 is connected across each SCR and poled for opposite direction conduction. Current is samples by current sampling transformers 26, 28, and 30, shunted by resistors 20, 22, and 24, each of these resistors being connected in series with an input to motor 10. Transformers 26, 28, and 30 are individually connected across one of these resistors (via a primary winding, as shown), and with one secondary terminal grounded, the other secondary terminal provides a discretely phased current signal output (as shown in waveform c of FIG. 3). Terminal X is associated with phase A, terminal Z is associated with phase C, and terminal Y is associated with phase B. A power factor signal, a signal inversely proportional to the current-voltage phase differential of each of the three-phase inputs, is obtained, separately, by phase detectors 32, 34, and 36. Phase detector 32 receives a current responsive signal sample from terminal Z, representative of the C phase current, and a voltage signal from transformer 38, representative of the A−C phase voltage, and provides a first phase detected output on terminal 40. Phase detector 34 receives a sample from terminal Y, representative of the B phase current, and a C−B voltage sample from transformer 42 and provides a second phase detected output on terminal 40. Phase detector 36 receives a phase A current signal sample from terminal X, and a B−A phase voltage sample from transformer 44 and provides a third phase detection signal on terminal 40. The three signals, designated $P_1$, $P_2$, and $P_3$, respectively, from the three-phase detectors are shown in waveforms f and g of FIG. 3.

Figure 2:
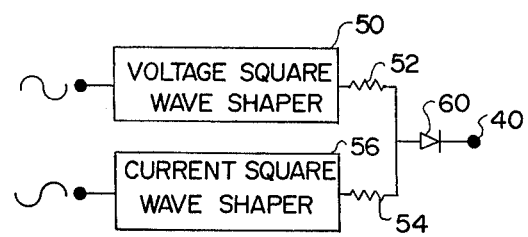
FIG. 2 is an electrical schematic diagram of the phase detectors employed in the embodiment of the invention shown in FIG. 1.

The phase detectors are identical, and an embodiment of each is shown in FIG. 2. It includes two conventional squaring circuits. One is voltage square wave shaper 50, which provides through resistor 52 a rectangular wave (waveform b of FIG. 3) responsive to the input voltage (waveform a of FIG. 3). The second one is current square wave shaper 56, which provides through resistor 54 a rectangular wave (waveform d of FIG. 3), representative of the negative half cycle of input current (waveform c of FIG. 3). This output of phase detection is also noted by the ± signs at the input terminals of the phase detectors (as shown in FIG. 1). The outputs of the two wave shaping circuits are combined through resistors 52 and 54. Diode 60 passes only the positive portion of each output to terminal 40, which is common with the outputs of phase detectors 32, 34, and 36 (as shown in FIG. 1). Waveform e illustrates the combination process showing the waveform of a single phase detector as it would appear without diode 60, which diode eliminates the negative portions of the waveforms. Significantly, in the detection process, each phase detector produces a pulse (e.g., $P_1$ from detector 32, $P_2$ from detector 34, and $P_3$ from detector 36) which is, in effect, turned "on" by the leading or rising edge of waveform b and turned "off" by the trailing edge of waveform d. Thus, the width of pulse $P_1$ (it has a constant amplitude) tends to increase upon the occurrence of increased phase angle between current and voltage (thus decreased power factor) and decrease in width with decreased phase angle (and thus increased power factor).

Figure 3:
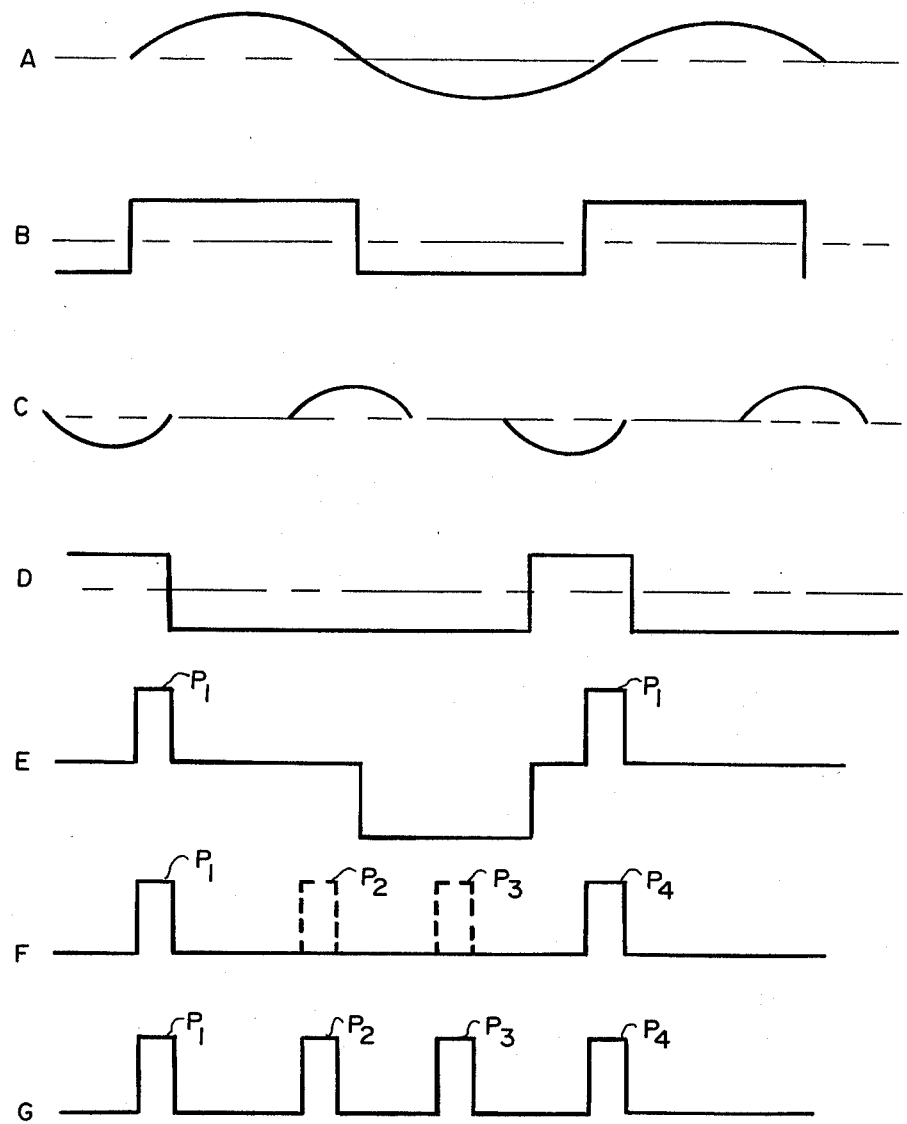
FIG. 3 consists of a series of waveforms illustrative of the operation of the phase detector shown in FIG. 2.

Assuming, as indicated, that pulse $P_1$ represents the output of phase detector 32, waveforms f and g illustrate the relatively time presence of output pulses $P_2$ and $P_3$ from phase detectors 34 and 36, respectively. As the outputs are brought together at terminal 40, waveform g of FIG. 3 illustrates the combined signals at this point. This composite of these becomes the basic feedback control signal, and as will be noted, this is a signal of pulses of a repetition rate of 180 Hz. This is in contrast to previous circuit approaches wherein a single phase detected output (from one of the three phases) is employed, which would, of course, have been either at a 60 Hz or 120 Hz rate, depending upon whether a half or full wave detection was employed.

Figure 4:
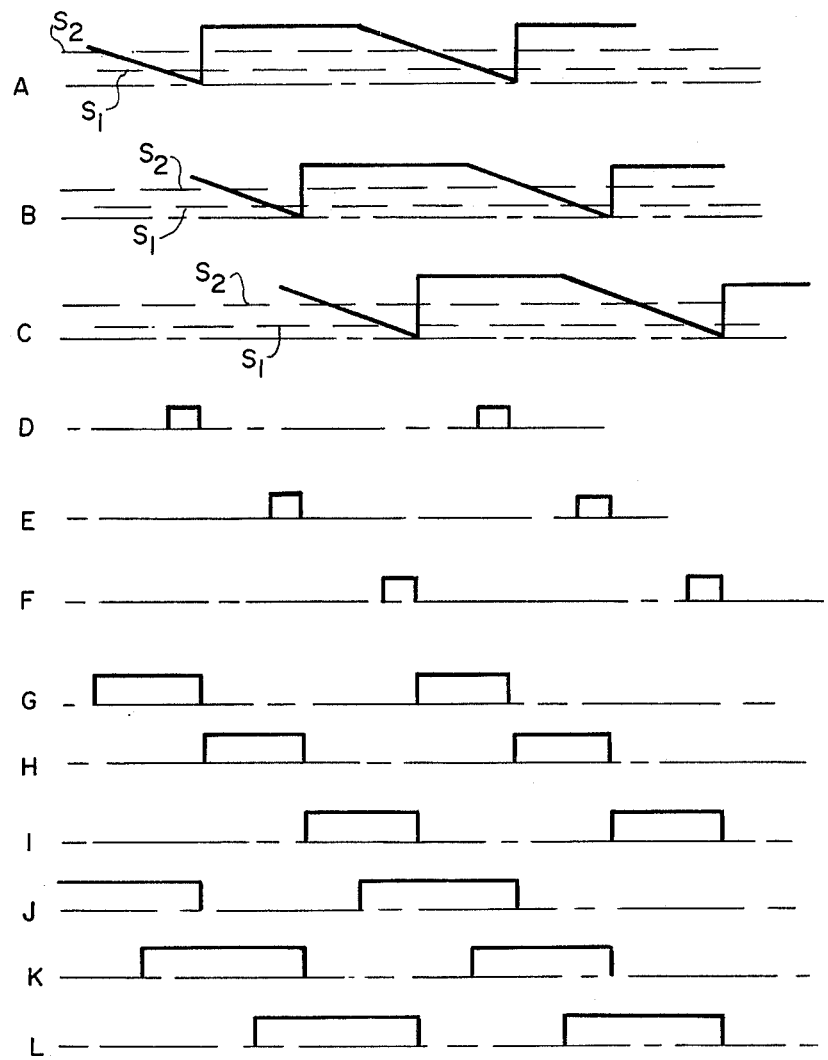
FIG. 4 consists of a series of waveforms illustrating the generation of triggering pulses in accordance with the circuitry shown in FIG. 1.

The next step in accordance with this invention is to effect a signal conditioning of the control signal wherein the direct current character of the signal must be compatible with the thyristor trigger circuitry and still have a frequency response up to on the order of 20 Hz. The control signal is applied to the inverting input of operational amplifier 64 of signal condition or integrating circuit 66, together with a power factor command signal supplied through resistors 68 and 69 from potentiometer 70. Potentiometer 70 is biased negatively to provide a difference or subtraction signal with respect to the positive signal as developed at the outputs of the phase detectors. Signal conditioning is effected by an inverse feedback network consisting of two circuits, one being capacitor 72 connected between the output and inverting input of operational amplifier 64, and the other consisting of a series combination of capacitor 74 and resistor 76 connected between these two points. The feedback network is basically an integrative or lag one. The combination of resistor 76 (approximately 15,000 ohms) and capacitor 74 (approximately 5 MFD) is initially effective (at zero frequency) to commence providing a lag effect. At about 2 Hz, the lag state commences to diminish as the value of resistor 76 commences to have a dominant effect over capacitor 74. Then, at about 20 Hz, capacitor 72 (approximately 0.68 MFD) commences to be effective to again impose a pronounced lag effect. The resulting signal is a relatively smooth signal representing the integral of the composite outputs of the phase detectors less the command signal. The signal, as used, is represented by the sample signal waveforms $S_1$ and $S_2$ as shown in FIG. 4. It is important that while the signals have a relatively smooth and constant level, approximating the average signal value present, the signal must be responsive to signal changes incident to changes in motor loading, typically calling for a signal response upward to approximately 20 Hz. This is achieved by the circuitry shown.

The circuitry thus far described was designed for the development of a control signal for a regulation of input power to motor 10 once the motor was started. The present invention is particularly directed to developing a signal for controlling the application of power to motor 10 during the period from the instant when power is turned "on" for a discrete selected interval of typically 5 to 30 seconds, during which the motor will have increased to operating speed. The purpose of this invention, as described above, is to prevent abrupt surges in input current which are not necessary for starting the motor and to accomplish this without accompanying instabilities. To accomplish this, circuitry is added which provides a substitute command signal to that provided by potentiometer 70 during the start-up interval.

In order to insure that the substitute signal will be in place before any control signal is utilized, operational amplifier 64, which processes control signals, is initially disabled for approximately 100 milliseconds. As operational control signals are applied to the inverting input of operational amplifier 64, and are negative going to provide turn-on signals for the thyristors, a counter or disabling signal is applied to its non-inverting input. This is accomplished by applying a −15 volts to capacitor 76, which is in series with resistor 78, in turn connected between the non-inverting input of operational amplifier 64 and ground. The time constant of this circuit is adjusted to effect signal blocking for the period described.

As a means of preventing a possible turn-on signal from getting to the thyristors until operational amplifier 64 is disabled, the output of trigger oscillator 102, which triggers on the thyristors, is initially blocked. This is accomplished by NPN transistor 150, which is connected through output resistor 152 across the output of oscillator 102. Transistor 150 is initially turned "on", shorting the output of oscillator 102 by a declining ramp signal appearing across resistor 154, which is in series with capacitor 156 and a +15 volts source. Typically, the time constant provided by resistor 154 and capacitor 156 is such that transistor 150 would be essentially discharged in approximately 10 milliseconds, after which the blocking action would cease and transistor 150 would be turned "off", enabling a normal output from oscillator 102.

In addition to the precautions described above to insure that motor 10 will not turn "on" before the starting circuitry is operative, means are provided to prevent the application of a normal "run" command signal from potentiometer 70 during the entire starting interval. This is accomplished by connecting PNP transistor 158, collector-to-emitter across the output of potentiometer 70, between resistors 68 and 69. Transistor 158 is turned "on" upon the application of power to the circuitry by a negative voltage applied to its base through resistor 160 from the output of operational amplifier 162. In this manner, the output of potentiometer 70 is effectively shorted out. The negative output state of operational amplifier 162 is effected by applying a greater negative bias on its non-inverting input than on its inverting input. The bias to the non-inverting input is a fixed bias, being a selected fraction of −15 volts as provided by a voltage divider comprising resistors 164 and 166 and connected across the −15 volts as shown. Initially, the voltage applied to the inverting input of operational amplifier 162 is zero, the initial output of operational amplifier 182, and thus the potential on the non-inverting input of operational amplifier 162 prevails.

Potentiometer 168, through resistor 170, provides an initial starting level negative signal to terminal 172 where it is added to a negative going, start-up, ramp signal supplied from the output of starting ramp generator 174 through resistor 176.

NPN transistor 178 is connected emitter-to-collector between terminal 172 and ground and provides means of blocking an interfering effect from a starting signal after the starting sequence. Transistor 178 is controlled by an output through resistor 180 from operational amplifier 162 and is initially held "off" during the starting sequence by the negative output of operational amplifier 162.

Starting ramp generator 174 is a conventional integrator comprising operational amplifier 182 and a capacitor 184 connected from its output to its inverting input. A selected positive bias is obtained from potentiometer 186, connected between the +15 volts terminal and ground. This bias is fed through input resistor 192 to the inverting input of operational amplifier 182. The result is that, upon the application of voltages to the circuit, there will initially occur at the output of operational amplifier 182 an essentially zero voltage which ramps down negatively at a selected rate determined by this bias and the time constant of capacitor 184 and input resistor 192 to achieve a desired rate of motor turn "on" signal. The negative going signal at the output of operational amplifier 182 is fed through resistor 176 to terminal 172 and there added to a voltage from potentiometer 168, fed through resistor 170. This signal is then applied through resistor 183 to terminal 40 and there summed with the operating power factor (or current-voltage phase angle) signal and applied to operational amplifier 64 to effect an increasing (negatively) control signal which gradually, over a typical period of 5 to 30 seconds, results in effective motor voltage to be raised to full voltage. The actual operational control effected by the control signal on the thyristors is discussed below.

The output of operational amplifier 182 is also applied, in this case, to the inverting input of operational amplifier 162; and when the output rises to a level which exceeds the level applied to the non-inverting input of operational amplifier 162, the output of the latter switches from a negative state to a positive state. This changed state is fed as a switching potential to transistors 178 and 158 to turn transistor 178 "on" and transistor 158 "off". The result is that transistor 178 prevents any further starting signal from appearing at terminal 172, and transistor 158 unblocks the output of potentiometer 70 to restore normal power factor control for "run" operation of motor 10.

It is significant that during the start-up cycle, although the normal power factor command signal from potentiometer 70 is disabled, the effective power factor signal, summed from phase detectors 32, 34, and 36, continues to be an effective control input. This combination overcomes the tendency of motor instabilities to occur, which is common with certain other types of motor start-up circuitry.

Actual thyristor triggering signals, whether during the start of run modes, are developed by the comparison of the control signal (e.g., $S_1$ and $S_2$ of FIG. 4) output of operational amplifier 64 and ramp shaped signals r. A ramp signal for each phase is developed by one of conventional ramp generators 84, 86, and 88, responsive to A−C, C−B, and B−A phase voltages from transformers 38, 42, and 44, respectively. The ramp outputs r of these generators are illustrated by solid line in waveforms a, b, and c, respectively, of FIG. 4, and are separately applied to conventional comparators 90, 92, and 94, together with a control signal from operational amplifier 64. In operation, a comparator provides a pulse output when the level of the control signal, e.g., dashed line $S_1$ of FIG. 4, intersects the leading edge of a ramp signal. Thus, as shown, for example, with a control signal $S_1$ applied to the comparators, there is produced output pulses shown in waveforms d, e, and f of FIG. 4. These pulses, which result in the triggering of the thyristors, as will be described, occur once per cycle, and are thus representative of a half wave mode of operation. The relatively narrow triggering pulses shown as waveforms d, e, and f of FIG. 4 produce relatively short turn-on times for SCR devices 12, 14, and 16, and thus produce a relatively low RMS input voltage to motor 10. This state of operation will initially have been brought about by phase detectors detecting a downward shift in power factor (by an upward shift in current-voltage phase angle) occurring when motor loading is shifted to a low state. The resulting output signal of operational amplifier 64 will be such as to produce a motor RMS input voltage which brings about an equilibrium between the commanded power factors determined by the bias output of potentiometer 70 and integrated output of the phase detectors.

The actual control of the current turn-on periods for the thyristors is effected by gates 96, 98, and 100, which pass high frequency signals responsive to the outputs of comparators 90, 92, and 94. Gates 96, 98, and 100 are electronic switches and function to effect gating of the high frequency signal (e.g., 10 KHz) from high frequency oscillator 102 through the primary windings of transformers 104, 106, and 108 to the thyristors. Resistor 110 and diode 112 are connected in series across the primary of each transformer in order to suppress inductive voltages to a safe level consistant with semi-conductive circuitry employed. The secondaries of transformers 104, 106, and 108 are connected (as shown) in series with diode 114 between the gate and cathode of SCR devices 12, 14, and 16. Turn-on periods for the thyristors follow, for example, the period of the pulse outputs of the comparators (as shown in waveforms d–i). The waveforms marked by waveforms g–i, which are produced by control signal $S_2$, are illustrative of the turn-on periods for a moderately to substantially loaded motor in contrast to pulses shown in waveforms d–f, which are indicative of a slightly loaded or a motor having no load.

During start-up, there would initially be provided a triggering output as illustrated by the narrow width pulses shown in waveforms d–f, and these would gradually widen until they were of a complete half cycle width as represented by waveforms j–l as the output of ramp generator 174 increases negatively as described. After the start-up period, and assuming there is a lightly loaded or unloaded motor, the system would adjust to a control as dictated by potentiometer 70 to provide, again, minimum length pulses as shown in waveforms d-f. Alternately, if the motor were moderately loaded, the "after" pulse widths would be as shown by waveforms g-i.

While there is illustrated herein the application of the present invention to a three-phase system, the invention is equally applicable in the manner described to a single-phase system. Further, while FIG. 1 illustrates a three-phase system employing SCR devices as thyristors in a basically half wave control system, it is to be appreciated that the invention is also applicable to full wave three-phase systems employing either triacs or SCR devices connected in anti-parallel.

In summary, it is to be noted that by means of the present invention, the substantial benefits provided by a power factor type controller for a running motor may be extended to cover motor start-up and thus to provide a single and overall control for an induction motor.

I claim:

1. A power factor control system for an A.C. induction motor comprising:
   current sampling means, including means adapted to be placed in circuit with at least one phase winding of a said motor, for providing an A.C. output signal representative of the timing of alternating current through said winding;
   voltage sampling means adapted to sense the voltage of an electrical input applied to said winding for providing an output signal representative of the timing of alternating current voltage across said winding;
   phase detection means responsive to the outputs of said current and said voltage sampling means for providing an output which varies in accordance with the difference in phase between said current and voltage;
   signal means for providing a control signal comprising an increasing signal followed by a fixed level signal, the latter comprising a power factor command signal; and
   control means adapted to be electrically connected in series with a said winding of a said motor, and responsive to the combined outputs of said phase detection means and signal means for varying the duration of "on" time of each cycle of input power to said winding as an inverse function of the output of said phase detection means and direct function of the output of said signal means;
   whereby a gradually increasing power input may be effected to a said motor during a selected starting interval and thereafter the motor be controlled by said fixed power factor command signal.

2. A system as set forth in claim 1 wherein said motor is a three-phase motor and has three said windings.

3. A system as set forth in claim 1 wherein said signal means includes means for separately generating said power factor command signal and responsive to an initial turn-on of power to said system for initially, and for a selected period, blocking the supplying of said power factor command signal to said control means, and for that period supplying said increasing signal to said control means.

4. A system as set forth in claim 3 wherein said means for separately generating said power factor command signal includes means for manually adjusting said last-named signal, and said signal means includes ramp signal generating means for providing said increasing signal to said control means.

5. A system as set forth in claim 4 wherein said means for initially blocking the supplying of said power factor command signal includes means responsive to said ramp generating means for unblocking the supplying of said power factor command signal to said control means upon said increasing signal increasing to a selected value.

6. A system as set forth in claim 5 wherein said signal means includes means for providing a selected initial minimum level for said increasing signal, whereby at least a minimum starting control signal is applied to said control means.

7. A system as set forth in claim 6 wherein said control means includes a thyristor in series with a said winding and includes means for blocking an operating signal to said thyristor until said signal means provides a signal to said control means.

8. A system as set forth in claim 7 wherein said motor is a three-phase motor having three said windings, and there is a thyristor in series with each said winding.

* * * * *